United States Patent [19]
Grosseau

[11] 3,767,271
[45] Oct. 23, 1973

[54] ANTI-LOCKING DEVICES

[75] Inventor: Albert A. G. Grosseau, Chaville, France

[73] Assignee: Societe Anonyme Automobiles Citroen, Paris, France

[22] Filed: July 14, 1970

[21] Appl. No.: 54,741

[30] Foreign Application Priority Data
July 28, 1969 France .............................. 6925692

[52] U.S. Cl. ................................ 303/21 F, 303/68
[51] Int. Cl. ............................................. B60t 8/12
[58] Field of Search ..................... 188/181; 303/6 C, 303/20, 21, 58, 59, 61, 63, 68

[56] References Cited
UNITED STATES PATENTS

| | | | |
|---|---|---|---|
| 3,554,612 | 1/1971 | Harned ....................... | 303/21 F UX |
| 3,425,751 | 2/1969 | Wehde et al. ................ | 303/21 F |
| 3,532,391 | 10/1970 | Klein .......................... | 303/21 F |
| 3,549,212 | 12/1970 | Leiber ........................ | 303/21 F |
| 3,495,881 | 2/1970 | Harned et al. .............. | 303/21 F |
| 3,521,934 | 7/1970 | Leiber ........................ | 303/21 F |

FOREIGN PATENTS OR APPLICATIONS
1,901,477  1/1969  Germany ........................... 303/21 F

*Primary Examiner*—Milton Buchler
*Assistant Examiner*—Stephen G. Kunin
*Attorney*—Marn & Jangarathis

[57] ABSTRACT

In a motor vehicle an anti-locking braking device associated with the wheel brakes and including supply fluid under pressure connectible to the brake cylinders through a three-way valve which is controlled by a known device for detecting abnormal deceleration of the wheels. The valve is interposed between the supply, the brake cylinders and exhaust and can be operated to connect the suuply to the brake cylinders or the brake cylinders to exhaust. In the exhaust path there is provided a flow-limiter which may be merely a restriction orofice and a damper interposed in the exhaust path between the controlled three-way valve and the flow-limiter. The damper may simply be a piston and cylinder device in communication with the exhaust path, the piston being balanced by the exhausting fluid pressure and a spring.

12 Claims, 4 Drawing Figures

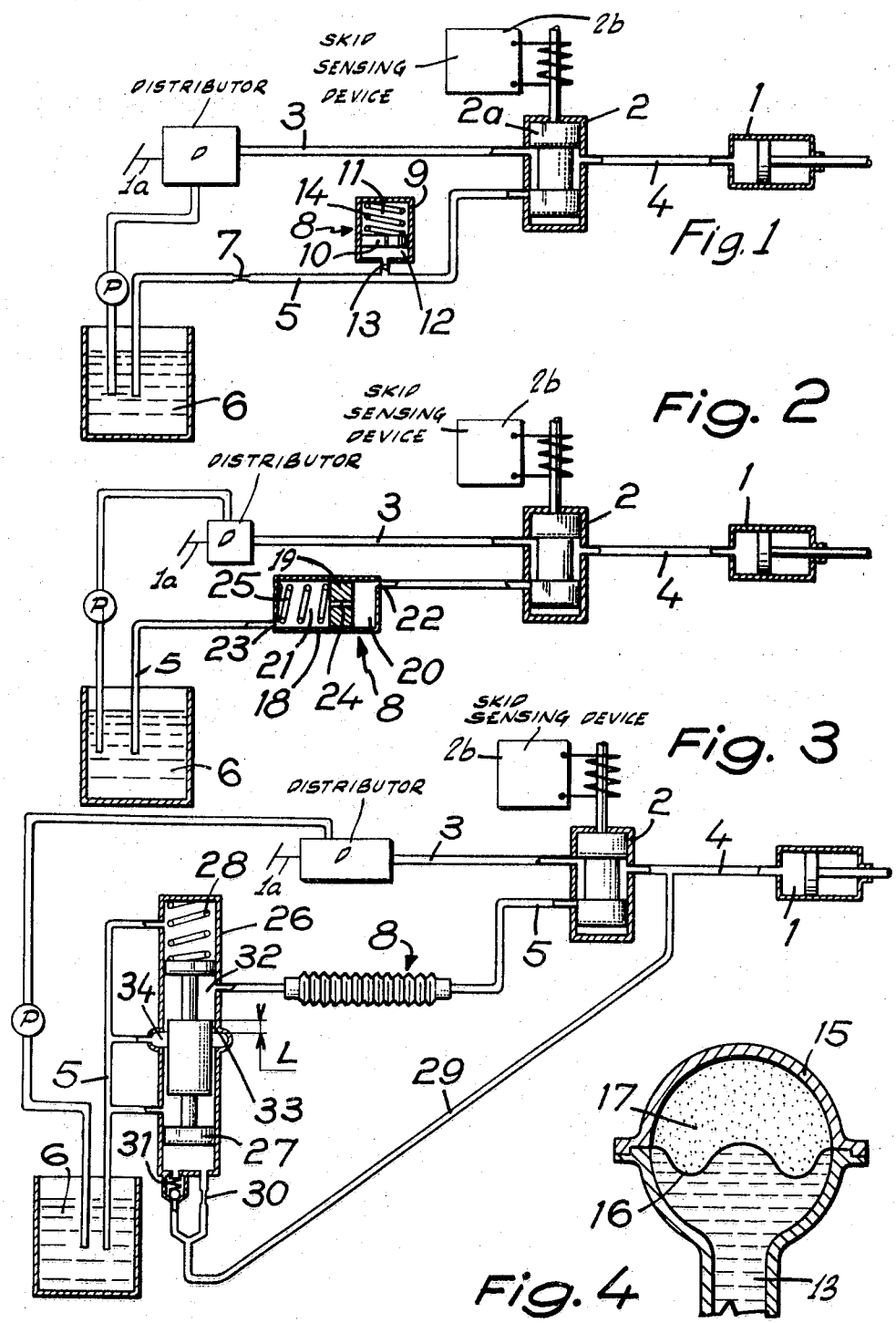

ANTI-LOCKING DEVICES

This invention relates to anti-locking devices for vehicle brakes.

In the field of braking mechanisms for vehicles, in particular motor vehicles, it is known that the most effective braking is obtained directly before the locking of the wheels. In contrast, when the wheels are locked, and the vehicle has not yet stopped, the braking is poor.

In order to avoid this disadvantage, there have been added to the customary braking mechanisms antilocking devices.

An anti-locking device may be constituted for example, by a means for detecting an abnormal deceleration of the wheel, such detector means controlling a three-way valve. This valve makes it possible to isolate the brake cylinders of the wheels from the supply of fluid under pressure and to open these cylinders to the atmosphere or a fluid reservoir during the period of abnormal deceleration augmented by a period of time during which rotation of the wheel is re-started.

The valve may be an electro-valve and thus simplifies adjustment of the anti-locking device so as to obtain satisfactory operation when the coefficient of adhesion of the wheel on the ground is low.

However, such an anti-locking device has a noticeable effect when the coefficient of adhesion is high, since, on the one hand, the sudden variations in pressure in the brake cylinders cause very unpleasant jerks or surges in the movement of the vehicle and, on the other hand, the distance necessary for a given deceleration of the vehicle is noticeably greater than that which corresponds to the optimum braking force.

An object of the present invention is to improve the quality of the braking in vehicles incorporating such an anti-locking device by suppressing in particular the abovementioned disadvantages which occur when the coefficient of adhesion is high.

Thus, to obtain satisfaction of this object there is provided an anti-locking braking device for the wheels of a motor vehicle, comprising a source of fluid under pressure, brake-operating cylinders for the wheel brakes, a valve controlled by a device for detecting abnormal deceleration of the wheels and adapted to put the cylinders selectively in communication with the source of fluid under pressure and with exhaust, a flow-limiter arranged in the exhaust path and a damper interposed in the exhaust path pipe between the valve and the flow-limiter with the flow-limiter providing for the continous flow of fluid therethrough.

The flow-limiter is preferably controlled by the pressure of the fluid contained in the brake cylinders.

The flow-limiter may be constituted by a slide or piston guided in the body or cylinder of a control valve, a channel provided between the slide and the body of the control valve constituting the flow-limiter proper and the slide being maintained in equilibrium in the body under the effect of the counter actions of a spring and of the pressure of fluid supplied by a pipe connected to the brake cylinders, the length of the channel constituting the flow-limiter corresponding to the position of the slide in the body regardless of the type of the design of the flow limiter in the drawings, it is understood that the flow-limiter allows for the continuous flow of brake fluid therethrough during operation of the anti-locking braking device.

In the immediately preceding embodiment of flow-limiter a restriction may be provided in the pipe connected to the brake cylinders. In addition, a non-return valve may be arranged in the pipe, in parallel with the restriction to ensure passage of fluid from the cylinders to the body of the control valve.

Moreover, the damper may be constituted according to a first embodiment by a cylinder provided with an aperture for connection in parallel to the exhaust path and a piston slidably mounted in the cylinder to define two separate chambers and maintained in equilibrium under the opposing actions of a spring and the pressure of fluid from the exhaust path.

In another embodiment, the damper is constituted by a cylinder provided with an aperture for connection in parallel to the exhaust path and mounting internally a fluid-tight flexible diaphragm isolating a volume of gas under pressure from the fluid of the exhaust path.

Finally, the damper may also be constituted by a flexible, elastic pipe connected in series with the exhaust path.

In a particular embodiment, the damper is constituted by a cylinder provided with two apertures for connection in series to the exhaust path, while a piston slidably mounted in the cylinder defines two separate chambers in the cylinder and is balanced under the opposing actions of a spring and of the pressure of fluid contained in the exhaust path between the cylinder and the control valve, and the flow-limiter is constituted by a restriction connecting the two chambers defined in the damper cylinder. The restriction may be constituted by a hole bored in the piston and connecting the two sides of the piston.

Embodiments of the present invention will now be described, by way of example, with reference to the accompanying drawing, in which:

FIG. 1 is a diagrammatic illustration of one embodiment of a braking mechanism according to the invention;

FIG. 2 is a similar view of a second embodiment of a braking mechanism according to the invention;

FIG. 3 is a similar view of a third embodiment of a braking mechanism according to the invention; and, FIG. 4 is a section of a detail of a braking mechanism according to the invention.

In FIG. 1, there is shown a cylinder 1 coupled to the brake (not shown) of a wheel of a vehicle the cylinder 1 is actuated by a source of fluid under pressure, for example by a pump P through an appropriate distributor D controlled by a pedal 1a. A three-way electro-valve 2 is also included in the brake mechanism and is controlled by a skid sensing device 2b for detecting abnormal decelerations of the wheel, which device is known per se.

Three pipes are connected to the electro valve 1, the pipe 3 being connected to the source of fluid under pressure, the pipe 4 connected to the brake cylinder 1 and the exhaust or outlet pipe 5 being connected to atmosphere or to a fluid reservoir 6 depending on whether the brakes are air or oil operated for example.

It should be noted that, depending on the position of the slide or piston 2a of the electro-valve 2 in the body or cylinder of the said electro-valve, there is established selectively connection either between the pipes 3 and 4 or between the pipes 4 and 5, the pipe 3 being preferably isolated from the pipes 4 and 5.

In the exhaust pipe 5, a flow-limiter 7 is provided and is constituted by a constriction in the exhaust pipe 5 to provide for the continuous flow of fluid therethrough during the operation of the anti-locking device.

In addition, there is provided a damper 8 constituted by a cylinder 9 inside which a piston 10 is slidably mounted to define two separate chambers 11 and 12. The cylinder 9 is provided with an aperture 13 communicating with the chamber 12, while a spring 14, perhaps metallic, is provided in the chamber 11. The chamber 12 is connected in parallel to the exhaust pipe 5 through the aperture 13, between the flow-limiter 7 and the electro-valve 2, the piston 10 being in equilibrium in the body 9 under the opposing actions of the spring 14 and of the pressure of the fluid possibly contained in the chamber 12 and/or in the part of the exhaust pipe 5 connected to the chamber 12.

It will be well understood that the damper 8 has equivalents, such as, for example, the hollow rigid body 15 of FIG. 4 provided with an aperture 13 for connection in parallel to the exhaust pipe 5. Inside the body 15 there is provided an air-tight flexible diaphragm 16, between which and the body there is trapped gas under pressure 17 spaced from the aperture 13.

Referring to FIG. 2, most of the parts already mentioned are shown again. However, it will be noted that the damper 8 is constituted by a cylinder 18, inside which there is slidably mounted a piston 19 to define two separate chambers 20 and 21. The cylinder 18 is provided with two apertures 22 and 23, which open respectively into the chambers 20 and 21 and facilitate the connection in series of the cylinder 18 to the exhaust pie 5. Moreover, the piston 19 is provided with a restriction orifice 24, which connects the two sides of the piston 19. Finally, when the damper 8 is connected in series to the pipe 5, the piston 19 is in equilibrium in the cylinder 18, under the counter effect of a spring 25 provided in the chamber 21 which is connected to the reservoir 6 and of the pressure of fluid possibly contained in the chamber 20 which is connected to the part of the pipe 5 connected to the electro-valve 2, and/or of the fluid contained in the said part of the pipe 5. It will have been noted in the present embodiment that the flow-limiter, provided in the outlet pipe 5, is constituted by the restriction orifice 24.

In FIG. 3, certain of the parts already mentioned are shown. In addition, starting from the electro-valve 2 and following the exhaust pipe 5, there is provided connected in series to the pipe 5, the damper 8, which is constituted, in this case, by a flexible elastic pipe, and then, the body or cylinder 26 of a control valve.

Inside the cylinder 26 there is a slide or piston 27 mounted in equilibrium under the opposing action of a spring 28 and of the pressure of fluid carried by a pipe 29 connected to the pipe 4. It should be noted that a restriction 30 is arranged in the pipe 29 and in parallel with this restriction 30, a nonreturn valve 31 is provided to ensure the passage of fluid from the pipe 4 towards the cylinder 26 of the control valve. The pipe 5 extending from the damper 8 opens into the chamber 32 provided between the piston 27 and the cylinder 26. A passage 33 is also provided between the piston 27 and the cylinder 26 and constitutes the flow-limiter proper. This channel 33 is connected to the part of the exhaust pipe 5 which returns to the reservoir 6. In the example shown, the channel 33 is constituted by an annular cylindrical gap of length L, which connects the chamber 32 to a groove 34 connected by the pipe 5 to the reservoir 6. This annular gap is constituted in the example shown, by the play which is provided between the cylinder 26 and the corresponding part opposite the piston 27 which has, at this point, a smaller section than that of the cylinder 26.

The advantages that are gained from the use of anti-locking braking devices according to the invention are given hereafter.

According to the embodiments illustrated in FIGS. 1 and 2, at the moment when the skid sensing device 2b for detecting abnormal locking of the wheel has acted on the slide of the electro-valve 2 in order to isolate the pipe 4 from the pipe 3 and to connect the pipe 4 to the exhaust pipe 5, the pressure in the pipe 4 and thus in the brake cylinder 1 falls rapidly the fluid enters, without any noticeable opposition, the chambers of the dampers 8, connected to the part of the pipe 5 connected to the electro-valve 2. This fall in pressure is generally sufficient to re-start the wheel. The pressure of the fluid may, however, if necessary, continue to decrease as the fluid escapes towards the reservoir 6 through the flow-limiter 7 or 24.

However, it may occur that, in the case of low adherence, when the vehicle in travelling on icy ground for example, the sudden fall in initial pressure is inadequate to unlock the wheel. In this case, there would advantageously be employed the braking device shown in FIG. 3, or a similar device.

In fact, the device of FIG. 3 has its flow-limiter 33 controlled by the pressure of fluid contained in the brake cylinder 1. The length L of the flow-limiter 33 and thus the efficiency of the limiter will be all the greater since the pressure in the pipe 29 will be higher, or even since the adhesion of the wheel on the ground will itself be higher and, inversely, the length L of the flow-limiter 33 and the corresponding limitation of flow will be practically zero, when the pressure in the pipe 29 and consequently the pressure which has caused the locking of the wheel is low, or even, when the coefficient of adhesion of the wheel on the ground is low.

During the period of response of the electro-valve 2, at the moment when the wheel locks, the pressure of fluid conveyed by the pipe 29 and acting on the piston 27 is kept at a value close to that in the brake cylinder 1 by the combination of the restriction 30 and of the non-return valve 31. Since the rise in pressure is much slower than the fall in pressure, the non-return valve 31 is not always necessary.

It will be realised that with the aboveproposed braking devices, it is possible, on the one hand, to unlock the wheel quickly without the pressure falling too much, thus without, on ground having high coefficients of adhesion, the increase in pressure causing undesirable jerking of the vehicle and, on the other hand, to adjust the fall in pressure to be effected to the coefficient of adhesion encountered locally.

It will also have been noted that, if the preceding description has only been given in relation to a single wheel, it is naturally possible to detect the locking of each of the wheels of a group of wheels of a vehicle, the braking members of the wheels of the group of wheels being fed by a single circuit and comprising a common return to the fluid reservoir 6 effected by a single damper 8 and a single flow-limiter. The description and claims should be construed accordingly.

What is claimed is:

1. An anti-locking braking assembly for a motor vehicle which comprises a source of fluid under pressure; a cylinder coupled to a brake of a wheel of said motor vehicle; a sensing means for detecting abnormal deceleration of said wheel; a valve means controlled by said sensing means for placing said cylinder in fluid communication selectively with said source of fluid under pressure and with an outlet conduit; a fluid flow limiting means for the restrictive but uninterrupted flow of fluid therethrough provided in said outlet conduit; and a fluid accumulator interposed in said outlet conduit between said control valve and said fluid flow limiting means.

2. A device according to claim 1, in which the flow restriction means is controlled by the pressure of fluid contained in the cylinder.

3. A device according to claim 2, in which the flow-limiter is constituted by a slide in the body of a control valve, a channel provided between the slide and the body constituting the flow-limiter proper with the slide being maintained in equilibrium in the body under the effect of the counter actions of a spring and of the pressure of fluid supplied by a pipe connected to the cylinder, and the length of the channel constituting the flow-limiter corresponding to the position of the slide in the body.

4. A device according to claim 3, in which a first restriction is provided in the pipe connected to the cylinder.

5. A device according to claim 4, in which a non-return valve is arranged in the pipe in parallel with the first restriction and ensures passage of fluid from the cylinder to the body of the control valve.

6. A device according to claim 1, in which the damper is constituted by a cylinder provided with an aperture for connection in parallel to the exhaust path, and inside which there is an air-tight flexible diaphragm isolating a volume of gas under pressure from the fluid of the exhaust.

7. A device according to claim 1, in which the damper is constituted by a flexible, elastic pipe connected in series with the exhaust path.

8. A device according to claim 1, in which the damper is constituted by a cylinder provided with two apertures for connection in series to the exhaust path, a piston being slidably mounted in the cylinder to define two separate chambers and being maintained in equilibrium under the opposing actions of a spring and of the pressure of fluid contained in the exhaust path between the cylinder and the control valve, the flow-limiter being constituted by a second restriction connecting the two chambers defined in the cylinder by the piston.

9. A device according to claim 8, in which the second restriction is constituted by a hole bored in the piston and connecting the two sides of the piston.

10. An anti-locking device as defined in claim 1 wherein said outlet is in fluid communication with a reservoir at atmospheric pressure, and wherein said fluid accumulator is a chamber.

11. The anti-locking braking assembly as defined in claim 1 wherein said fluid accumulator is comprised of a cylinder provided with a conduit means for connection of said cylinder in parallel to said outlet conduit and wherein a piston is slidably provided in said cylinder and defines therein two separate chambers, said piston being maintained in equilibrium under the opposing actions of a spring and of the pressure of the fluid in said outlet conduit.

12. In an anti-locking braking assembly for a vehicle including a source of fluid under pressure, a cylinder coupled to a brake of a wheel of the vehicle, a sensing means for detecting abnormal deceleration of the wheel, a valve means controlled by the sensing means for placing the cylinder in fluid communication selectively with the source of fluid under pressure and an outlet conduit, the improvement comprising a fluid flow limiting means for the restrictive but uninterrupted flow of fluid therethrough provided in said outlet conduit and a fluid accumulator interposed in said outlet between said control valve and said fluid flow limiting means.

* * * * *

P/2076

UNITED STATES PATENT OFFICE
CERTIFICATE OF CORRECTION

Patent No. 3,767,271              Dated October 23, 1973

Inventor(s) ALBERT A. G. GROSSEAU

It is certified that error appears in the above-identified patent and that said Letters Patent are hereby corrected as shown below:

Claims 2 to 9 of the issued patent should read as follows:

--2. An anti-locking braking assembly as defined in Claim 1 wherein said fluid flow limiting means is controlled by the pressure of fluid contained in said cylinder.

3. An anti-locking braking assembly as defined in Claim 2 wherein said fluid flow limiting means is formed by a slide within a body of a control valve with a channel provided therebetween and wherein said slide is maintained in equilibrium by the counter actions of a spring and of the pressure of fluid in an additional conduit in fluid communication with said cylinder and wherein the length of the channel constituting said fluid flow limiting means corresponding to the position of said slide within the body of said control valve.

4. An anti-locking braking assembly as defined in Claim 3 wherein a fluid flow restriction means is provided in said additional conduit.

5. An anti-locking braking assembly as defined in Claim 4 wherein a check valve means is provided in said additional conduit in parallel flow to said fluid flow restriction means to ensure the flow of fluid from said cylinder to said control valve.

6. An anti-locking braking assembly as defined in Claim 1 wherein said fluid accumulator is comprised of a cylinder having an orifice for connection in parallel flow to said outlet conduit, and wherein said cylinder is provided with an air tight flexible diaphragm isolating a volume of gas from the fluid in the outlet conduit.

... continued

UNITED STATES PATENT OFFICE
CERTIFICATE OF CORRECTION

Patent No. 3,767,271       Dated October 23, 1973

Inventor(s) ALBERT A. G. GROSSEAU

It is certified that error appears in the above-identified patent and that said Letters Patent are hereby corrected as shown below:

7. An anti-locking braking assembly as defined in Claim 1 wherein said fluid accumulator is comprised of a flexible elastic pipe member connected in series with said outlet conduit.

8. An anti-locking braking assembly as defined in Claim 1 wherein said fluid accumulator is comprised of an accumulator cylinder and a piston slidably mounted therein, said accumulator cylinder provided with apertures for serial connection in said outlet conduit, said piston defining separate chambers within said accumulator cylinder, said fluid flow limiting means connecting said chambers, and said chamber being maintained in equilibrium under the opposing action of a spring within a chamber of said cylinder and of the fluid in said outlet conduit.

9. An anti-locking braking assembly as defined in Claim 8 wherein said piston is provided with an orifice which constitutes said fluid flow limiting means. --

Signed and sealed this 5th day of November 1974.

(SEAL)
Attest:

McCOY M. GIBSON JR.
Attesting Officer

C. MARSHALL DANN
Commissioner of Patents